: Patented June 1, 1943

2,320,486

UNITED STATES PATENT OFFICE 2,320,486

TREATMENT OF ALCOHOLIC LIQUORS

Frederick E. Stuart, Baltimore, Md.

No Drawing. Application June 25, 1940,
Serial No. 342,285

5 Claims. (Cl. 99—48)

The invention is a process of refining alcoholic liquors by which is meant, generally, distilled and fermented alcoholic beverages. The object is to remove certain natural acid constituents from such liquors without impairing their taste or appearance. Alcoholic liquor, for example whisky, exhibits an acid reaction which commonly runs from 3.5 to 5.5 pH on the hydrogen ion scale. I have found that the constituents to which this acid condition is largely due are of minor importance with respect to the taste of the liquor, but that they have an effect on the human system, apart from that of the alcohol, which is objectionable and commonly manifested by indigestion, biliousness or general malaise. I have found further that it is not sufficient merely to neutralize these acid factors as by the addition of some alkaline salt, as has already been proposed, because such additions made in requisite quantity tend to ruin the taste or destroy the brilliance or clarity of the liquor or produce sediment in the bottle; any liquor thus doctored would not be easily salable.

Liquor, for example whisky, treated according to this invention is still whisky. It retains its original flavor and bouquet, incidentally also its intoxicating quality, but it is minus the objectionable properties referred to and can be consumed by persons to whom such liquor is ordinarily unacceptable without the customary adverse effects and with less physical upset in the case of excessive consumption.

By way of illustration, but without limitation to the detail, a typical example of the process is as follows:

To 500 c. c. of the particular liquor to be treated, say a whisky testing at 4.35 pH, there is added 60 c. c. of milk-of-lime which has been previously prepared as a stock solution and consists of a suspension of 2.4 grams of calcium hydroxide $Ca(OH)_2$ in 400 c. c. of distilled water. This is stirred briskly into the liquor for a few minutes, usually by means of a propeller type stirrer.

The effect of this first, and preparatory, stage of the treatment is somewhat of a complex reaction not requiring explanation further than to say that it involves the reaction of the calcium hydroxide with some of the $CO_2$ and $H_2O$ and possibly other constituents of the liquor, and results in the formation of calcium carbonate $CaCO_3$ and some calcium bicarbonate, $CaHCO_3$, the latter being in solution. The liquor turns murky and its taste becomes distinctly altered and unpleasant, but it is now definitely alkaline in character, exhibiting a pH value of about 8.6.

The next stage of the treatment, which may be termed the flocculation stage, is done by the addition of a small portion, say 1 c. c., of a water solution of sodium bi-phosphate, $NaH_2PO_4.H_2O$, which has been previously made up as a stock flocculation solution and contains 2.4 grams of the bi-phosphate in 400 c. c. of distilled water. This addition is briskly stirred into the alkaline liquor at a propeller speed of, say, 50 or 60 R. P. M. but for only a few seconds and for producing a quick dispersion. It is then and immediately stirred at a pre-selected and very slow speed, approximating 2 to 4 R. P. M., and for say about 4 or 5 minutes. The addition of the sodium bi-phosphate produces coagulation or flocculation in the alkaline liquor and the slowness of the stirring speed is important to the end that the flocs shall form and grow quickly to a size or weight that will allow them to settle promptly when the agitation has ceased, with the least tendency to disintegrate them. Stirring is stopped on the attainment of such flocs. By careful attention to the rate of stirring, flocs can be produced of large size which will settle in about an hour, leaving a brilliant supernatant liquor which is then decanted or if desired filtered. Such liquor will possess its original character and bouquet and will be slightly alkaline. The degree of its alkalinity depends on the ratio of the milk-of-lime dosage to the initial acid value of the liquor, which is subject to variation. In the example given, it was pH 7.35.

The precipitated floc or sludge will be found to contain calcium carbonates and phosphates and to have carried down some of the products of the reaction above referred to. On the removal of these precipitated substances the liquor is ready for bottling.

The amount of flocculator needed to make the floc is critical to the alkalizing dosage, which as stated is dependent on the character of the particular liquor to be treated and the product desired. The degree of agitation is also critical and these conditions, of dosage size and stirrer speed, must therefore be established in advance. Also the particular agent used for creating the initial alkalinity and for initiating flocculation is subject to variation; for example, a soda-ash solution, $Na_2CO_3$, might be used as a substitute for the stock milk-of-lime solution, and other flocculators such as aluminum sulphate, ferric chloride and sodium aluminate ($NaAlO_2$), might be used as flocculators, in substitution, or in addition, since these latter do not remain in the liquor.

It is accordingly not possible to prescribe the precise amounts or concentrations of the materials needed for the treatment, but with a knowledge of the principle involved these factors are readily determined. An example of the appropriate procedure is as follows:

About six samples of the particular liquor are placed in separate receptacles respectively provided with small propeller stirrers driven by a common variable speed motor. Different graded dosages of the alkalizing agent are added to the several samples and stirred, these dosages being in the general range calculated to result in an ultimate product testing at the desired pH. Then different graded or selected dosages of the flocculator are introduced into the several receptacles and careful note is taken of the dosage proportions in the receptacle in which flocculation appears to form first or most abundantly, and then with further samples of the proportions of this selected receptacle, note is taken of the stirring speed (always slow) that conduces to the best growth of the floc. The purpose, as will be observed, is to determine the optimum ratio of acid to base that will permit or induce flocculation in the particular liquor. The factors of dosage and speed, as thus determined, then govern the above-described larger scale treatment of the liquor in question and yield the result stated.

It is pointed out that while the initial milk-of-lime dosage is preferably selected to give an alkaline reaction to the product of between pH 7.5 and 11.4 which represents a novel form of alcoholic liquor, such dosage can be modified to give none at all, that is to say, produce a substantially neutral liquor, and such neutral liquor also has advantage over normal or commercial liquors in respect to physiological effects, or if desired the dosage can be so gauged as merely to reduce the normal liquor acidity, to near a neutral condition, thereby reducing though not entirely eliminating the adverse effects of the constituents referred to.

It can be inferred from the nature of the treatment that when the product is alkaline, its alkalinity may derive from the presence therein of some slight amount of calcium bicarbonate, that being one of the reaction products, soluble in the liquor as above pointed out, but after flocculating treatment the presence of the bicarbonate is without effect on the clarity or brilliance of the liquor and it has been found that further alkaline addition can be made to the product liquors of this process without effect on the clarity, so that it becomes possible, when necessary, to adjust the final alkalinity with extra-close precision to any required specification. Ordinarily however sufficient accuracy can be obtained by the correct initial alkalizing dosage.

While the process as above described refers to the treatment of liquors otherwise ready for packaging or sale it can be applied at any earlier stage of manufacture where convenience suggests and circumstances permit. In the case of blended liquors, it can be applied to one or more of the blend components which can thereafter be combined or the final blend can be so treated, as preferred. The process can likewise be used to lighten the color of dark fermented liquors, if that should be desired, by simply prolonging the flocculation stage, as by continuing the slow stirring with the flocs present. By such treatment much of the natural coloring matter, as well as some of the flavoring matter, is gathered into the flocs and removed with them.

While the careful slow stirring during flocculation is important in obtaining good flocs, there is of course no limitation as to the particular agency by which it is done so long as the proper degree of agitation is produced, as established by the preliminary determination. A properly adjusted and controllable stream of air or the like, injected below the surface, can be employed.

I claim:

1. The process of treating distilled alcoholic beverage liquor which consists in dosing the liquor with an alkaline substance adapted to raise its pH value above 7, adding a flocculating agent to the so dosed liquor, stirring the liquor at a rate to cause the development and growth of flocs therein, and separating the liquor from such flocs.

2. The process of reducing acidity of distilled alcoholic beverage liquor which comprises treating the liquor with a dosage of basic substance calculated to raise the pH value of the liquor above the level desired for the product, treating such dosed liquor with an acid-reacting substance calculated to neutralize the unwanted excess of the alkaline content and initiate flocculation, then stirring the liquor at a slow rate to cause the growth of large flocs therein, allowing such flocs to settle and separating the clear liquor therefrom.

3. The process of treating distilled alcoholic beverage liquors to give them a pH value of about 7 which comprises adding a basic reagent to the liquor in quantity sufficient to raise its pH value to above 7, adding an acid-reacting salt in amount adapted to reduce the pH value of the liquor to not less than about 7, and initiate a flocculatable condition in the liquor, then slowly stirring the liquor at a rate to cause the flocs to develop and grow in size, and separating the liquor from the enlarged flocs.

4. The process of treating distilled alcoholic beverage liquors to give them a pH value of about 7 which comprises stirring milk of lime into the liquor in quantity sufficient to raise its pH value to about 8.6, then adding sodium biphosphate in amount calculated to reduce the pH value of the liquor to not less than about 7, then slowly stirring the liquor to build up flocs therein and removing the clear liquor from such enlarged flocs.

5. The process of removing natural coloring matter from distilled alcoholic beverage liquor which comprises first treating the liquor with a dosage of basic substance calculated to raise the pH value of the liquor above the level desired for the product, treating the liquor with an acid-acting substance calculated to initiate a flocculatable condition therein, then slowly stirring the liquor to develop large flocs, continuing such stirring of the enlarged flocs until the color has brightened to a desired extent, and then separating the flocs from the clear liquor.

FREDERICK E. STUART.